3,457,344
METHOD FOR DETECTING ANTIGENS
Tyoku Matuhasi, Kawaguchi-shi, and Toshikazu Kobayashi, Tokyo, Japan, assignors to Murex Welding Processes Limited, Hertfordshire, England
No Drawing. Filed June 7, 1966, Ser. No. 555,682
Int. Cl. G01n *33/16*
U.S. Cl. 424—12  5 Claims

ABSTRACT OF THE DISCLOSURE

A method for detecting an antigen in a test solution, wherein a mixture comprising an antiserum of relatively high concentration, red blood cells carrying the corresponding antigen, and a solution to be tested, is introduced into a capillary tube titled at an angle of between 30 and 60° and is held under stand-still conditions for about 10 to 15 minutes to undergo antigen-antibody reaction. Presence of the antigen in the test solution is identified by a linear precipitate which appears along the inner underside wall of the capillary tube, while absence of the antigen in the test solution is identified by a coarse velvet precipitate which appears over the inner underside wall of the capillary tube.

---

The present invention relates to a method for determining the presence of antigen in sample solutions and has particular reference to a qualitative and semi-quantitative determination of antigen in a sample solution by an indirect agglutination reaction utilizing a capillary tube.

For the detection of an antigen in a sample solution, there is known a so-called indirect hemagglutination method which has been widely used from the immunological point of view. The method is based on an antigen-antibody reaction in a test tube in which antigen-adsorbed particles are agglutinated with an antiserum corresponding to the antigen, so that the free antigen in the test solution may be determined qualitatively or quantitatively depending upon the presence or absence, respectively, of an antigen-antibody reaction.

The prior-art method just described, however, has certain disadvantages as it is time-consuming compared with the usual agglutination reaction and requires at least 0.2 ml. of a mixture of an antigen, antibody and test solution and complicated experimental apparatus and instruments to carry out the desired reaction with satisfactory results. Moreover, with a view to securing reliable results, the tests have to be conducted by highly skilled personnel.

It is, therefore, a primary object of the present invention to provide a new and useful method for the determination of an antigen in a sample solution which will eliminate the above-noted drawbacks inherent in the prior-art method.

It is another object of the invention to provide an improved testing procedure for determining an antigen in a given material to sufficient accuracy which requires a minimum length of time and relatively small amounts of reagents and test solutions to complete the necessary reaction.

It is a further object of the invention to provide a simplified antigen detection procedure with reliable results.

These objects and features of the invention will become more apparent from the following detailed description taken in conjunction with a preferred embodiment of the inventive concept.

The basic concept underlying the present invention resides in the determination of an antigen in a given sample solution by an antigen-antibody reaction performed in a capillary tube in lieu of the conventional test tube.

As compared with the reagents used in conventional in vitro hemagglutination methods, the reagent prepared according to the invention comprises an antiserum of higher concentration mixed with erythrocytes coated by an antigen of higher units. This reagent is admixed with small amounts of a test solution and introduced into a capillary tube. The capillary tube is then placed on a testing rack and tilted about 30° to 60°, and the solution therein is allowed to stand still for a predetermined length of time, until the antigen-adsorbed erythrocytes precipitate on the wall of the capillary. The precipitate thus formed is examined for its physical appearance so as to detect the antigen in the test solution.

More specifically, the method of the invention comprises admixing a reagent consisting of an antiserum of relatively high concentration and antigen adsorbed solid particles with a small amount of a test solution, introducing the admixture into a capillary tube about 1 mm. in diameter and 100 mm. long, placing the capillary tube on a testing rack with the tube tilted at an angle ranging from 30 degrees to 60 degrees and allowing the admixture therein to undergo an antigen-antibody reaction for about 10 to 15 minutes, whereafter the admixture is examined for its agglutination reaction thereby determining qualitatively and quantitatively the presence of antigen in the test solution.

When using, as a testing solution, human chorionic gonadotrophin (HCG) in the urine, the anti-HCG-antibody in the antiserum in the reagent is neutralized by the antigen-antibody reaction with HCG in the urine with the result that the HCG adsorbed erythrocytes recipitate linearly along the wall of the capillary tube without being agglutinated. In the absence of HCG in the urine, the anti-HCG-antibody in the reagent will participate in the antigen-antibody reaction with the HCG adsorbed erythrocytes, so that the erythcrocytes become agglutinated and precipitate over the capillary wall in the form of a coarse velvet.

The method described above may be applicable not only to HCG but also to γ-globulin, insulin, proteins and other antigen sources of large molecular weight.

The amount of antigen adsorbed to a reagent and the antibody titer of an antiserum according to the invention may be in a ratio considerably higher than that employed in the conventional hemagglutination method carried out with test tubes. For example, this ratio according to the invention may be from 1:8 to 1:16 depending upon the type of a test solution to be used.

The invention will now be discussed in respect of its important aspects.

Angles of inclination of capillary tube

In our experiments on the indirect hemagglutination reaction employing the reagents shown in the Examples hereinafter given and with the capillary tube tilted at different angles, we have obtained the following results.

| Angles of inclination of capillary tube | Dilution of antiserum $10 \times 2^n$ | | | | | | | | | | Negative contrast image |
|---|---|---|---|---|---|---|---|---|---|---|---|
| | $n=0$ | $n=1$ | $n=2$ | $n=3$ | $n=4$ | $n=5$ | $n=6$ | $n=7$ | $n=8$ | $n=9$ | |
| 0° | 3 | 3 | 3 | 3 | 3 | 3 | 1 | 1 | 1 | 1 | 1 |
| 10° | 3 | 3 | 3 | 3 | 3 | 2 | 1 | 1 | 1 | 1 | 1 |
| 20° | 3 | 3 | 3 | 3 | 3 | 2 | ± | ± | ± | ± | 0 |
| 30° | 3 | 3 | 3 | 3 | 2 | 1 | ± | 0 | 0 | 0 | 0 |
| 40° | 3 | 3 | 3 | 2 | ± | 0 | 0 | 0 | 0 | 0 | 0 |
| 50° | 3 | 3 | 1 | ± | ± | 0 | 0 | 0 | 0 | 0 | 0 |
| 60° | 3 | 2 | ± | ± | 0 | 0 | 0 | 0 | 0 | 0 | 0 |
| 70° | 1 | ± | 0 | 0 | 0 | 0 | 0 | 0 | 0 | 0 | 0 |
| 80° | ± | 0 | 0 | 0 | 0 | 0 | 0 | 0 | 0 | 0 | 0 |
| 90° | 0 | 0 | 0 | 0 | 0 | 0 | 0 | 0 | 0 | 0 | 0 |

3–1—Indicates positive agglutination; the value 3 prepresenting the highest positivity the value 2 moderate, and the value 1 low positivity.
±—Indicates little or no positivity in the agglutination.
0—Indicates negative agglutination.

As apparent from the table, the agglutination titer of the antiserum is highest at the inclination angle of zero and decreases with increasing angles. There was found little or no agglutination in the capillary tubes tilted more than 70 degrees.

With the capillaries tilted below 20 degrees, the resulting negative figure was not clear enough to enable us to read positive. Our experiments thus showed that the negative figure grows clearer the greater the angle of inclination of the capillaries, while the positive figure grows clearer the smaller the inclination angle. In this respect, the inclination angle has been found preferable at 40° with higher antiserum titer in order to obtain a distinctive negative figure. We have ascertained, however, that reliable results may be obtained with the capillaries tilted between 30 degrees and 60 degrees.

Antigen adsorbed to reagent vs. antibody titer of antiserum

The following table is intended to compare the prior-art test tube method with the inventive capillary method with respect to the reactivity of diluted anti-MCG serum with varied amounts of antigen adsorbed on erythrocytes.

| Antigen adsorbed | Capillary tube, dilution of anti-HCG serum ($10 \times 2^n$) | | | | | | Test tube dilution of anti-HCG serum ($10 \times 2^n$) | | | | | |
|---|---|---|---|---|---|---|---|---|---|---|---|---|
| | $n=1$ | $n=2$ | $n=3$ | $n=4$ | $n=5$ | $n=6$ | $n=1$ | $n=2$ | $n=3$ | $n=4$ | $n=5$ | $n=6$ |
| 50 I.U. | 0 | 0 | 0 | 0 | 0 | 0 | 0 | 0 | 1 | 2 | 1 | 0 |
| 100 I.U. | 0 | 0 | 0 | 0 | 0 | 0 | 0 | 0 | 1 | 2 | 2 | 0 |
| 200 I.U. | 0 | 0 | 0 | 0 | 0 | 0 | 0 | 2 | 3 | 3 | 2 | 0 |
| 400 I.U. | 2 | 1 | 0 | 0 | 0 | 0 | 2 | 3 | 3 | 3 | 3 | 3 |
| 800 I.U. | 3 | 3 | 2 | 0 | 0 | 0 | 3 | 3 | 3 | 3 | 3 | 2 |
| 1,500 I.U. | 3 | 3 | 3 | 3 | 1 | 0 | 3 | 3 | 3 | 2 | 1 | 1 |
| 3,000 I.U. | 3 | 3 | 3 | 3 | 2 | 0 | 2 | 3 | 3 | 2 | 1 | 1 |
| 6,000 I.U. | 3 | 3 | 3 | 3 | 1 | 0 | 1 | 2 | 3 | 3 | 1 | 1 |
| 12,000 I.U. | 3 | 3 | 3 | 3 | 1 | 0 | 1 | 2 | 2 | ± | 0 | 0 |

I.U.—denotes the International Unit.

From the above tabulated results we have taken particular note of the following two important aspects.

(1) Antigen adsorption and agglutination titer.—In the capillary method according to the invention, the agglutination titer incerases with an increase in the amount of antigen adsorption and remains nearly constant with antigens adsorbed in excess of 3000 I.U. Whereas, the agglutination reaction takes place in the test tubes with smaller amount of antigens adsorbed and continues to increase in titer with increasing antigen adsorption, but decrease in titer over 400 I.U. antigen adsorption.

Comparison of the two methods in the agglutination reaction proceeding at antigen adsorption amounts of 3000–6000 I.U. with capillary and 400–800 I.U. with test tube, respectively, shows that the former requires antigen of higher concentration at an antigen to antibody ratio of 1:8 to 1:6.

(2) Antigen adsorption and agglutination titer.—It has been found that the agglutination titer in the capillary method is greatest at 300 I.U. of antigen adsorption and $n=4$ of antiserum dilution, and with the conventional test tube method the maximum agglutination titer is noted at 400 I.U. of antigen adsorption and $n=6$ of antiserum dilution. This indicates that the capillary procedure requires antiserum of higher concentration than required for the conventional test tube method at an antigen to antibody ratio of 1:4 to 1:8.

EXAMPLE I

The invention will now be described in connection with one of its preferred embodiments in which an HCG is used as a test solution.

Anti-HCG serum reagent preparation

An experimental animal, for instance a rabbit, was inoculated with purified HCG thereby forming an anti-HCG antibody in its blood. The anti-serum reagent used in this example was prepared with the following composition:

Potassium dihydrogenphosphate _____ 0.6%
Disodium hydrogenphosphate _____ 3.7%
Normal rabbit serum _____ 1%
Anti-HCG serum _____ 2–4 antibody units Note: This composition was ascertained for indirect hem-agglutination of the anti-serum in a capillary tube and diluting the same to a maximum extent, the antibody titer of the diluted immunity serum solution being represented by 1 unit.

HCG adsorbed erythrocyte reagent preparation

An admixture of 1 part by volume of sheep erythrocytes (or other suitable animal erythrocytes or formalin treated erythrocytes), 2 parts by volume of 0.2 M phosphate buffer-containing saline and 3 parts by volume of 1/5000 tannic acid containing-saline was warmed at about 37° C. for about 40–60 minutes and thereafter washed with 0.02 M phosphate buffer-containing physiological saline solution. Then, 1 part by volume of the sheep erythrocytes thus treated with tannic acid was admixed with 2 parts by volume of 0.02 M phosphate buffer-containing saline and 3 parts of 4000 units of HCG dissolved in phosphate buffer-containing saline. This admixture was warmed at about 37° C. for about 3–4 hours and washed three times with 1% rabbit serum phosphate buffer solution thereby obtaining a reagent of the following composition:

Potassium dihydrogenphosphate _____percent__ 0.6
Disodium hydrogenphosphate _____do____ 3.7
Normal rabbit serum _____do____ 1
HCG adsorbed erythrocytes _____do____ 2.5
Purified water _____ 100

0.01 ml. of the anti-HCG serum and 0.02 ml. of the HCG adsorbed erythrocytes were admixed with about 0.01 ml. of urine and introduced into a capillary tube 1 mm. in diameter and 100 mm. long, which was placed on a testing rack and tilted about 40 degrees. After incubation of about 10 minutes, the admixture underwent an antigen-antibody reaction resulting in the formation of a line of precipitation of the HCG adsorbed erythrocytes downwardly along the inner wall of the capillary.

It should be noted that the above experiment may be conducted with a titer of an anti-serum to HCG adsorption ratio of about 1:8 to 1:16 as in the practice of the conventional test tube method; however, this ratio according to the invention may be widely varied depending upon the quality of the anti-serum available.

EXAMPLE II

This example deals with an anti-γ-globulin serum which was prepared by immunizing a rabbit with human γ-globulin. Gammaglobulin (1 mg. per ml.) was adsorbed to the erythrocytes treated with tannic acid. The reagents thus obtained were subjected to agglutination in a manner similar to that in Example I and with similar results.

The category of antigen particle sources usable according to the invention other than those exemplified herein above includes relatively high molecular-weight latexes, bentonite and the like.

Having thus described the invention, it will be understood that the invention is not limited to the specific form of process described but is subjected to modifications and adaptations which will occur to those skilled in the art.

What we claim is:

1. A method for detecting an antigen in a test solution sample, comprising admixing an antiserum of relatively high concentration and the corresponding antigen adsorbed on red blood cells with a small amount of said sample, introducing the admixture into a capillary tube, supporting the capillary tube at an angle between 30° and 60° and allowing the admixture to undergo antigen-antibody reaction under stand-still conditions, whereafter the admixture may be examined for its agglutination to determine qualitatively and quantitatively the presence of the antigen in said sample.

2. A method as defined in claim 1, wherein said capillary tube has a diameter of about 1 mm. and a length of about 100 mm.

3. A method as defined in claim 1, wherein said sample is a gamma-globulin solution, said antiserum is anti-gamma-globulin-serum and said antigen is gamma-globulin.

4. A method as defined in claim 1, wherein said admixture is maintained under stand-still conditions for at least about 10–15 minutes.

5. A method for detecting human chorionic gonadotrophin in a urine sample, comprising the steps of mixing anti-human chorionic gonadotrophin serum of relatively high concentration and human chorionic gonadotrophin adsorbed on red blood cells with a small amount of a urine sample; introducing the mixture into a capillary tube; supporting the capillary tube at an angle between 30° and 60° and allowing the mixture to undergo antigen-antibody reaction under stand-still conditions for about 10 to 15 minutes, whereby the mixture may then be examined for its agglutination to determine qualitatively and quantitatively the presence of human chorionic gonadotrophin in the urine sample.

References Cited

UNITED STATES PATENTS

| 3,088,875 | 5/1963 | Fisk | 167—84.5 |
| 3,236,732 | 2/1966 | Arquilla | 167—84.5 |

OTHER REFERENCES

Stoenner: Amer. J. Hygiene, vol. 57, 1953 pp. 316–326.

ALBERT T. MEYERS, Primary Examiner

A. P. FAGELSON, Assistant Examiner

U.S. Cl. X.R.

195—1.8; 424—85, 88